(12) United States Patent
Agrawal et al.

(10) Patent No.: US 9,015,417 B2
(45) Date of Patent: Apr. 21, 2015

(54) DEDUPLICATION-AWARE PAGE CACHE

(75) Inventors: Mukund Agrawal, Pune (IN); Shriram Wankhade, Pune (IN)

(73) Assignee: Symantec Corporation, Mountain View, CA (US)

( * ) Notice: Subject to any disclaimer, the term of this patent is extended or adjusted under 35 U.S.C. 154(b) by 742 days.

(21) Appl. No.: 12/969,360

(22) Filed: Dec. 15, 2010

(65) Prior Publication Data

US 2012/0159081 A1 Jun. 21, 2012

(51) Int. Cl.
*G06F 12/08* (2006.01)
*G06F 3/06* (2006.01)

(52) U.S. Cl.
CPC ............ *G06F 12/0866* (2013.01); *G06F 3/065* (2013.01); *G06F 3/0641* (2013.01)

(58) Field of Classification Search
CPC .. G06F 3/0641; G06F 2212/656; G06F 3/065
USPC .......... 711/126, 130, 202, 206, 208; 707/679, 707/692, 693
See application file for complete search history.

(56) References Cited

U.S. PATENT DOCUMENTS

| | | | |
|---|---|---|---|
| 2010/0211616 A1* | 8/2010 | Khandelwal et al. | 707/812 |
| 2010/0223432 A1* | 9/2010 | Eidus et al. | 711/148 |
| 2010/0299667 A1* | 11/2010 | Ahmad et al. | 718/1 |
| 2011/0218969 A1* | 9/2011 | Anglin et al. | 707/679 |

OTHER PUBLICATIONS

"EMC Data Domain Deduplication Storage System," www.EMC.com, EMC Corporation, 5 pages (2013).
"Introduction to Using EMC® Celerra® with VMware vSphere 4—Applied Best Practices Guide", EMC NAS Product Validation Corporate Headquarters, Hopkinton, MA, www.EMC.com, 55 pages (May 2009).
NetApp FAS2200 Series Datasheet, www.netapp.com, 4 pages (2013).

* cited by examiner

*Primary Examiner* — Aimee Li
*Assistant Examiner* — Gary W Cygiel
(74) *Attorney, Agent, or Firm* — Wilmer Cutler Pickering Hale and Dorr LLP

(57) ABSTRACT

An access request that includes a combination of a file identifier and an offset value is received. If the page cache does not contain the page indexed by the combination, then the file system is accessed and the offset value is mapped to a disk location. The file system can access a block map to identify the location. A table (e.g., a shared location table) that includes entries (e.g., locations) for pages that are shared by multiple files is accessed. If the aforementioned disk location is in the table, then the requested page is in the page cache and it is not necessary to add the page to the page cache. Otherwise, the page is added to the page cache.

17 Claims, 9 Drawing Sheets

DEDUPLICATION-AWARE PAGE CACHE

BACKGROUND

Data deduplication has become an important storage technology as organizations look to improve storage utilization and reduce costs. Deduplication works by looking for duplicate chunks (regions) of data—if, for example, two regions of data are identical, one region can be replaced with a pointer to the other. Deduplication helps to reduce storage requirements by reducing the amount of storage needed to store files that contain identical regions. Examples of where deduplication is useful include virtual machine images, online gaming applications that store game context for multiple users, audio and video clips that have overlapping regions served from media servers, desktops served from a common server to users in an enterprise, and medical imaging.

Conventionally, the focus of deduplication has been limited to storage features. Hence, deduplication does not address the problem of reducing memory requirements when identical regions are used by multiple applications, which results in duplicates appearing in the page cache. When a shared region is used by an application, process, or other type of user, the file system can check for duplicates and use the data in the page cache to populate the user buffer. However, the problem with this approach is that the same region is copied repeatedly into the user buffer, and so memory is not saved. Alternatively, many applications may attempt to memory map files to reduce storage requirements, but memory mapping of files is closely tied to the page cache mechanism, and hence the page cache needs to be made aware of duplicate pages.

SUMMARY

According to embodiments of the present disclosure, an access request that includes a combination of a file identifier and an offset value is received. If the page cache contains the page indexed by the combination, then processing of the access request can proceed. If the page cache does not contain the page indexed by the combination, then the file system is accessed and the offset value is mapped to a disk location. The file system can access a block map to identify the location. A table (e.g., a shared location table) that includes entries (e.g., locations) for pages that are shared by multiple files is accessed. If the aforementioned disk location is in the table, then the requested page is in the page cache and it is not necessary to add the page to the page cache, and processing of the access request can proceed accordingly. Otherwise, the page is added to the page cache and processing of the access request can then proceed accordingly.

In one embodiment, a list (e.g., a shared page list) associated with the disk location is updated to include an entry (e.g., a page descriptor) for the combination of file identifier and offset value that was included in the access request.

In one embodiment, the page is write-protected. A page fault is generated in response to an attempt to write to the page. A copy of the page is made, and a page descriptor of a file for which the write was attempted is pointed to the copy. Also, the page descriptor of the file for which the write was attempted is removed from the shared page list.

In summary, according to embodiments of the present disclosure, only one copy of a page may be kept in the page cache for the files (or applications or processes that rely on those files) that access identical regions. By eliminating duplicates of pages in the page cache, memory requirements are reduced. Furthermore, the approaches described herein represent generic approaches that can be used across different types of files systems.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
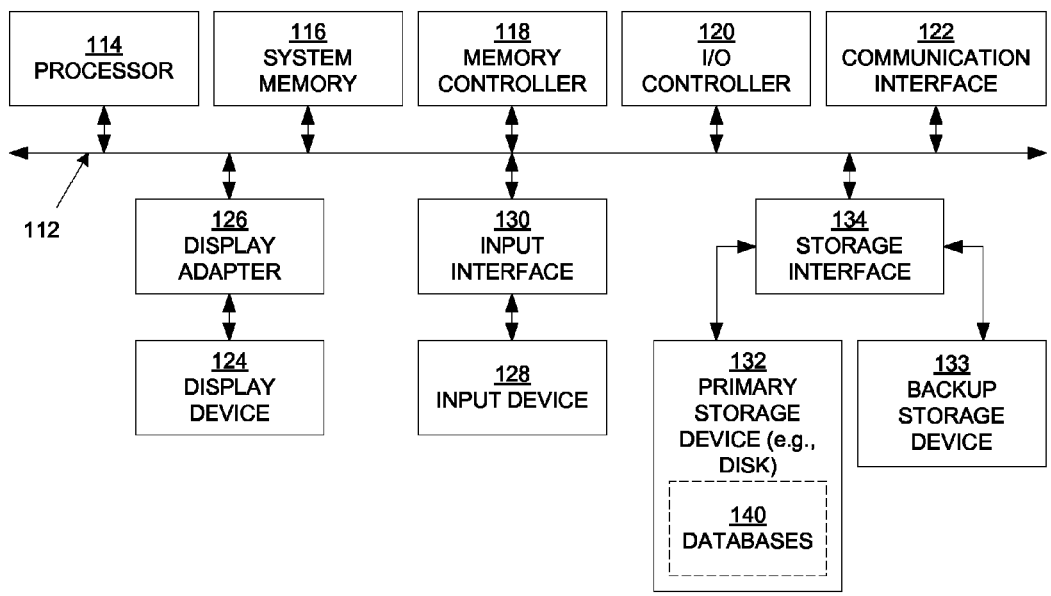
FIG. 1 is a block diagram of an example of a computer system upon which embodiments of the present disclosure can be implemented.

According to embodiments of the disclosure, whenever a region (e.g., a page frame) is to be read from memory, an additional check can be made to determine if the same region already exists in the page cache in the context of another file. This can be implemented by keeping a table of memory locations of shared regions and pointers to page descriptors. The table can contain entries for those shared regions that are currently in the page cache, and hence the table is relatively small in size.

The table can be used to implement page deduplication even when the underlying file system does not support deduplication. However, even if the file system does not support deduplication, the table can contain region checksums instead of their memory locations.

Generally speaking, embodiments according to the present disclosure have the advantage of keeping page cache deduplication independent of file system deduplication. In other words, deduplication in page caches is supported across file systems (independent of the type of file system). Although not being able to detect duplicates from the file system may slow the page cache mechanism, it is still useful if a large number of duplicate pages stay in the page cache for long periods of time.

In one embodiment, when the memory system decides to read a page from the file system using an access request that includes a combination of file identifier (e.g., an inode or vnode) and an offset value, the file system will first determine a memory location (a disk location) of the page using its block map. The file system will then return this disk location to the page cache using a callback mechanism. The page cache callback tells the file system whether the page cache already contains this region or not. If a "yes" is returned by the page cache, then file system code will be returned. If a "no" is returned by the page cache, then the file system will proceed to actually read the region from memory.

Another change introduced according to an embodiment of the present disclosure is that multiple page descriptors can point to the same page frame. This feature was not needed previously because, even if multiple processes were sharing the same page, the page frame belonged to the same file and so a single page descriptor was sufficient. A page descriptor structure is generally on multiple lists; for example, on one list related to a hash table, on another list of dirty pages, etc. According to an embodiment of the present disclosure, the page descriptor structure contains additional pointers in order to enable it to be on a new list—specifically, a list of all descriptors that point to the same page frame. That list may be referred to as the shared page list. The head of the shared page list is the disk location in the shared location table mentioned above.

Modifications to a page can occur when a process modifies the page through its address space in the case of memory mapped files, or using a write call (e.g., a virtual file system operational layer or vnode operational interface (VOP) write call). In one embodiment, such modifications are implemented using the operating system's page copy-on-write mechanism. The page can be write-protected, so that when the process tries to write to it, a page fault/exception will be generated. The fault handler code can be implemented to make a copy of the page frame, and to change the page descriptor of the file on which the write is called so that it points to the new page frame (the copy) instead of the shared page frame (the original). Also, the page descriptor associated with the shared page frame is removed from the shared page list.

If memory management wants to write a page to memory, then before updating the page in memory, a separate copy is made. The underlying file system or storage sub-system ensures that a write to memory happens to a new location instead of to a shared location.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "receiving," "determining," "adding," "generating," "making," "causing," "removing," "mapping," "using," or the like, refer to actions and processes (e.g., flowcharts 600, 800, and 900 of FIGS. 6, 8, and 9, respectively) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 110 capable of implementing embodiments of the present disclosure. Computing system 110 broadly represents any single or multi-processor computing device or system capable of executing computer-readable instructions. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between computing system 110 and one or more additional network or storage devices via an external bus or communications channel. Communication interface 122 may also allow computing system 110 to engage in distributed or remote computing. For example, communication interface 122 may receive instructions from a remote device or send instructions to a remote device for execution.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or it may represent multiple databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware.

Figure 2:
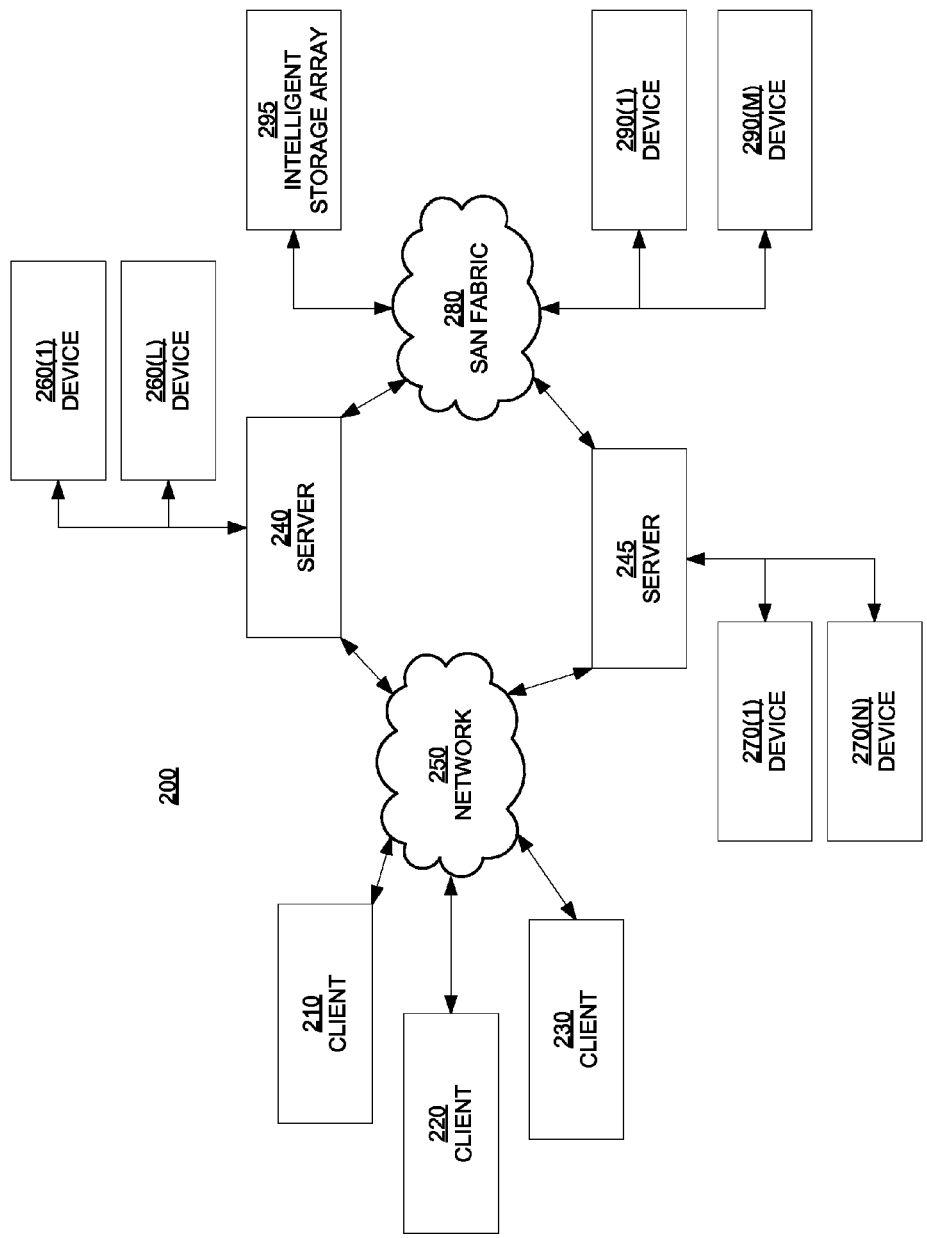
FIG. 2 is a block diagram of an example of a network architecture capable of implementing embodiments of the present disclosure.

FIG. 2 is a block diagram of an example of a network architecture 200 in which client systems 210, 220, and 230 and servers 240 and 245 may be coupled to a network 250. Client systems 210, 220, and 230 generally represent any type or form of computing device or system, such as computing system 110 of FIG. 1.

Similarly, servers 240 and 245 generally represent computing devices or systems, such as application servers or database servers, configured to provide various database services and/or run certain software applications. Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to server 240. Similarly, one or more storage devices 270(1)-(N) may be directly attached to server 245. Storage devices 260(1)-(L) and storage devices 270(1)-(N) generally represent any type or form of storage device or medium capable of storing data and/or other computer-readable instructions. Storage devices 260(1)-(L) and storage devices 270(1)-(N) may represent network-attached storage (NAS) devices configured to communicate with servers 240 and 245 using various protocols, such as Network File System (NFS), Server Message Block (SMB), or Common Internet File System (CIFS).

Servers 240 and 245 may also be connected to a storage area network (SAN) fabric 280. SAN fabric 280 generally represents any type or form of computer network or architecture capable of facilitating communication between storage devices. SAN fabric 280 may facilitate communication between servers 240 and 245 and storage devices 290(1)-(M) and/or an intelligent storage array 295. SAN fabric 280 may also facilitate, via network 250 and servers 240 and 245, communication between client systems 210, 220, and 230 and storage devices 290(1)-(M) and/or intelligent storage array 295 in such a manner that devices 290(1)-(M) and array 295 appear as locally attached devices to client systems 210, 220, and 230. As with storage devices 260(1)-(L) and storage devices 270(1)-(N), storage devices 290(1)-(M) and intelligent storage array 295 generally represent any type or form of storage device or medium capable of storing data and/or other computer-readable instructions.

With reference to computing system 110 of FIG. 1, a communication interface, such as communication interface 122, may be used to provide connectivity between each client system 210, 220, and 230 and network 250. Client systems 210, 220, and 230 may be able to access information on server 240 or 245 using, for example, a Web browser or other client software. Such software may allow client systems 210, 220, and 230 to access data hosted by server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in server 240, run by server 245, and distributed to client systems 210, 220, and 230 over network 250.

Figure 3:
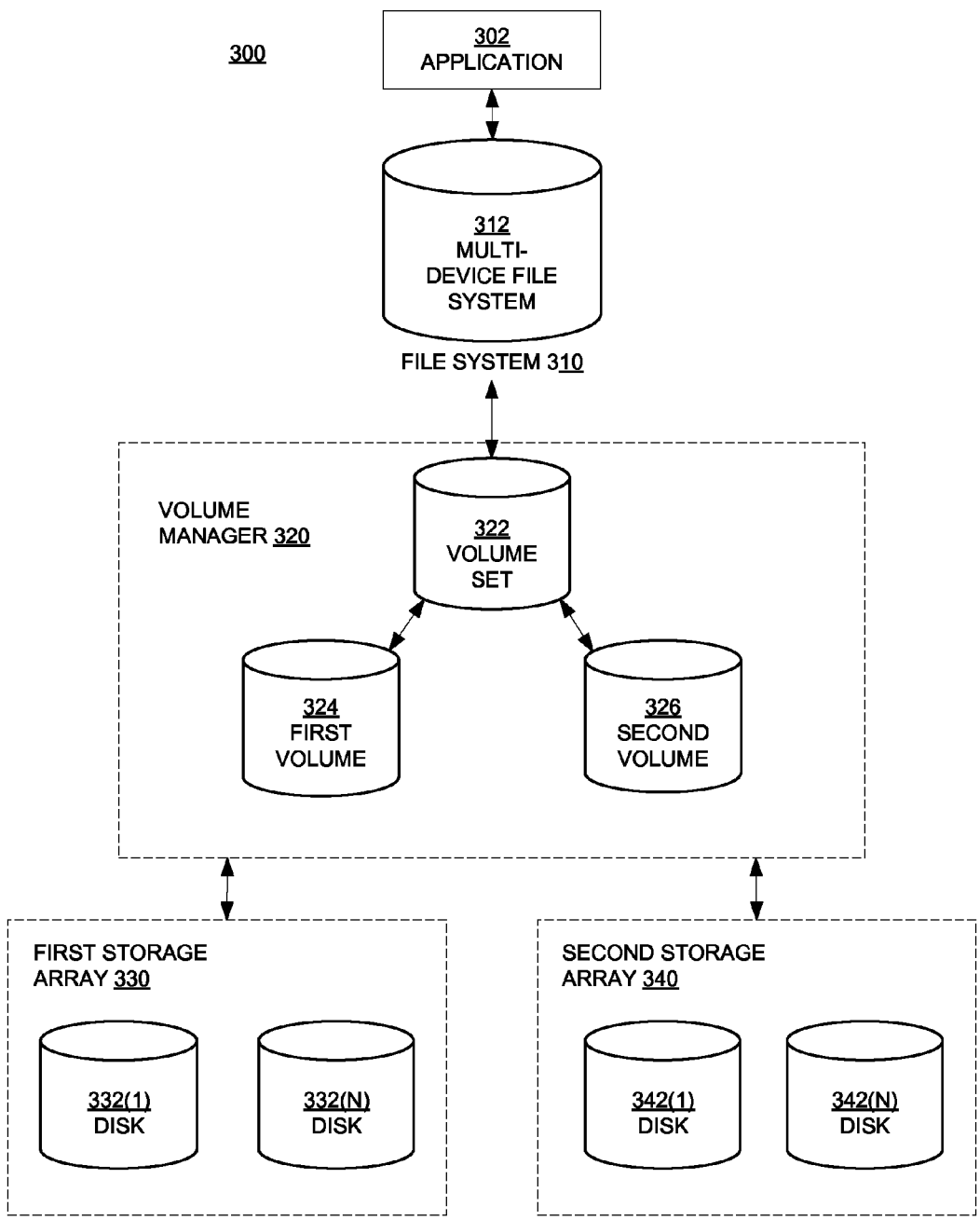
FIG. 3 is a block diagram of an example of a storage system capable of implementing embodiments of the present disclosure.

FIG. 3 is a block diagram of an example of a storage system 300 upon which embodiments of the present disclosure may be implemented. System 300 may include an application 302 in communication with a file system 310. File system 310 may include a multi-device file system 312 for multi-device storage. Multi-device storage generally refers to the use of different virtual or physical storage devices that provide differentiated storage for computing systems.

Storage system 300 can support multi-volume file systems through multi-device file system 312 and can provide automatic policy-based placement of portions (e.g., extents or blocks) of files within file system 310. A multi-volume file system may include file systems that occupy two or more virtual storage volumes. A multi-volume file system may present a single name space, making the existence of multiple volumes transparent to users and applications while maintaining awareness of each volume's identity, making it possible to control the locations at which portions of files are stored. In one embodiment, all files in multi-volume file system may be part of the same name space and are accessed and manipulated as though they occupy a single volume.

System 300 may also include a volume manager 320. Volume manager 320 may implement software-based virtualization for facilitating multi-device storage in the form of virtual volumes configured from multiple hardware devices. Volume manager 320 may include a volume set 322. Volume set 322 may be divided into a first volume 324 and a second volume 326. For example, first volume 324 may include a first storage array 330 (e.g., disk 332(1) through disk 332(N)). Similarly, second volume 326 may include a second storage array 340 (e.g., disk 342(1) through disk 342(N)).

Volume set 322 may be configured in a variety of manners. For example, first volume 324 and/or second volume 326 may be configured from enterprise disk array logical unit number units (LUNs), mid-range disk array LUNs, and/or disks connected directly to their host systems. First volume 324 and/or second volume 326 may also represent more complex configurations, such as mirrored volumes configured from RAID (Redundant Array of Independent Disks) LUNs presented by two disk arrays.

Figure 4:
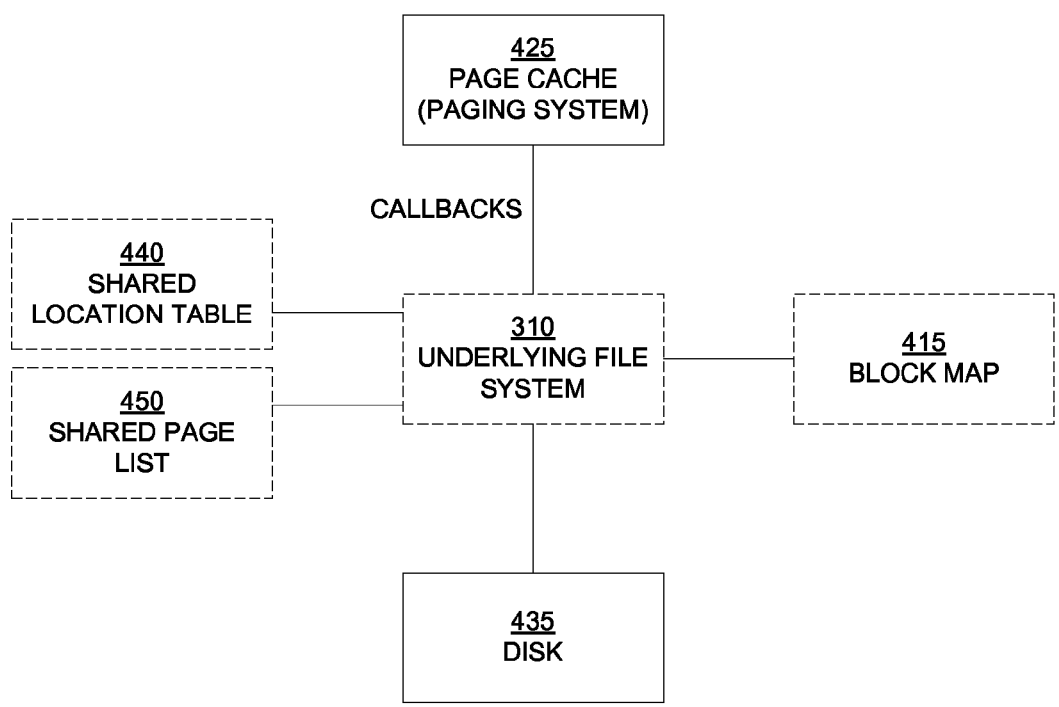
FIG. 4 is a block diagram illustrating selected elements employed by a file system according to an embodiment of the present disclosure.

FIG. 4 is a block diagram illustrating selected elements employed by file system 310 according to an embodiment of the present disclosure. In the example of FIG. 4, the underlying file system 310 is coupled to disk (storage) 435 (e.g., disk 332(1) through disk 332(N) and disk 342(1) through disk 342(N) of FIG. 3).

In one embodiment, a block map 415 is used by file system 310 to determine the on-disk location of data. The page cache 425 stores pages containing data of files based on read, write, and memory mapping operations performed on the files. File system 310 and page cache (paging system) 425 can communicate via callbacks.

As used herein, the term "page" refers to both a set of addresses and to the data contained in the set of addresses. A page may also be referred to herein as a "page frame;" generally speaking, a page frame contains a page of data.

Figure 5:
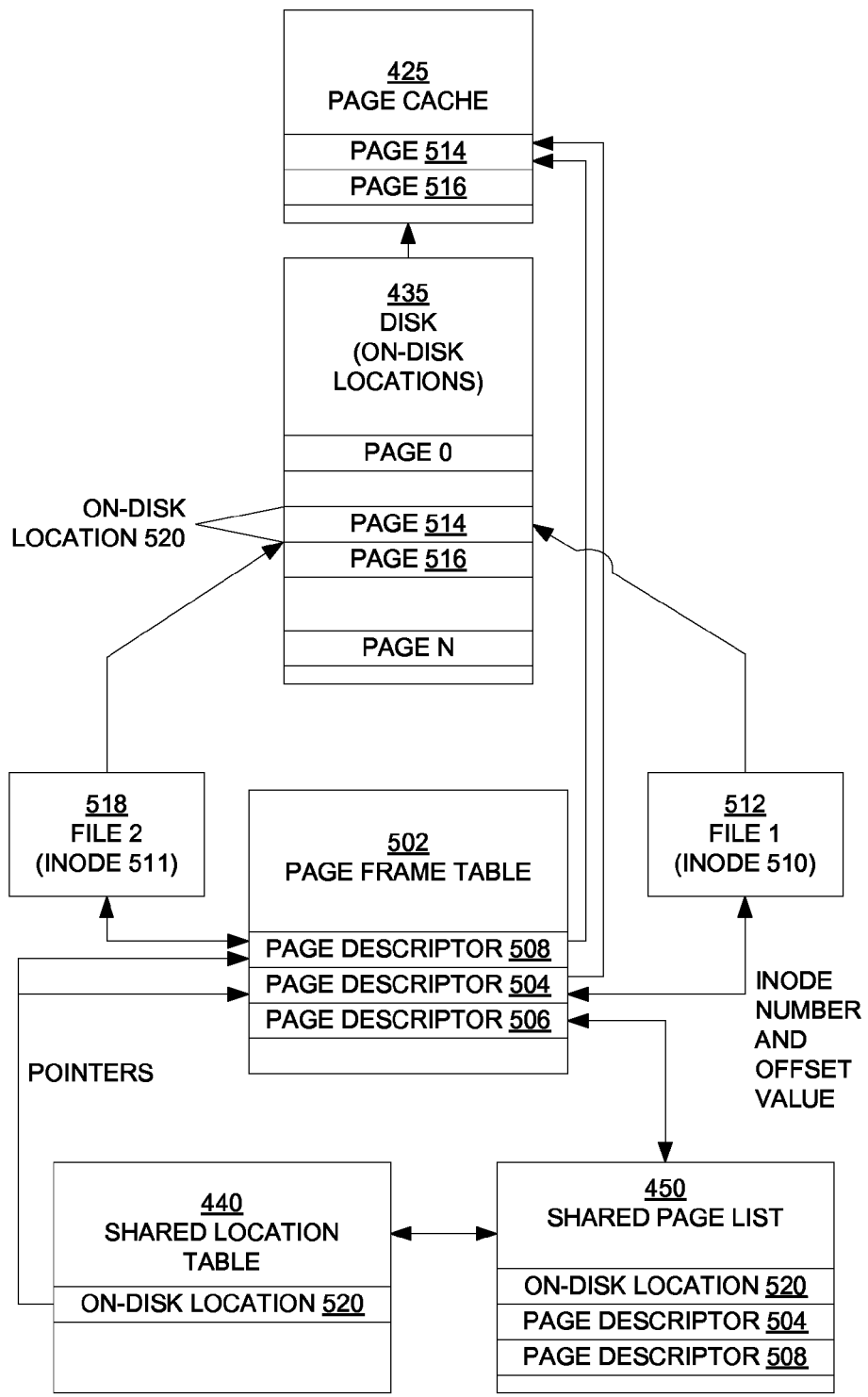
FIG. 5 is a block diagram showing various data structures utilized by a file system according to embodiments of the present disclosure.

The shared location table 440 and the shared page list 450 are described further in conjunction with FIG. 5, which is a block diagram showing various data structures utilized by a file system (e.g., file system 310 of FIG. 3) according to embodiments of the present disclosure.

In the example of FIG. 5, disk 435 includes pages 0 through N including data corresponding to memory page frames 514 and 516. The page frame table 502 is used to keep track of the pages that are in memory (e.g., page cache 425). Page frame table 502 contains a number of page descriptors such as the page descriptors 504 and 506; there is a page descriptor for each page frame in page cache 425 that contains data.

Each page descriptor includes a pointer to the address space in page cache memory 425 that holds the page frame to which the page descriptor belongs. For example, page descriptor 504 belongs to page frame 514, and therefore page descriptor 504 includes a mapping corresponding to page frame 514.

More specifically, in the example of FIG. 5, the mapping includes a file identifier (ID) such as inode number 510 that corresponds to the file 512; a directory inode (not shown) maps file 512 to inode number 510. The in-memory structure for file 512 points to page descriptor 504, which points to page frame 514. File 512 can also point to disk 435. Page descriptor 504 also includes an offset value that indicates the offset of page frame 514 within file 512. In a similar fashion, page descriptor 506 is mapped to page frame 516 (the mapping is not shown in FIG. 5).

In the example of FIG. 5, page frame 514 is a shared region. More specifically, page descriptor 508 also belongs to page frame 514, and therefore page descriptor 508 includes a mapping corresponding to page frame 514; the mapping includes inode number 511 that corresponds to file 518. The in-memory structure for file 518 points to page descriptor 508, which points to page frame 514. File 518 can also point to disk 435. Page descriptor 508 also includes an offset value that indicates the offset of page frame 514 within file 518. Thus, according to embodiments of the present disclosure, multiple page descriptors can point to the same page frame.

Embodiments in accordance with the present disclosure also introduce the shared location table 440 and the shared page list 450. Shared location table 440 includes a list of shared regions (e.g., page frames) of memory (e.g., disk location or address) and pointers to page descriptors. More specifically, it contains entries for regions that are in page cache 425 (FIG. 4). In the example of FIG. 5, shared location table 440 includes an entry for on-disk location 520, because that region is shared by multiple files (e.g., files 512 and 518), and shared location table 440 points to page descriptors 504 and 506 in page frame table 502. Shared location table 440 can include other entries (not shown).

Shared page list 450 includes a list of page descriptors that point to the same page frame; each list is headed by an entry in the shared location table 440. In the example of FIG. 5, shared page list 450 is headed by on-disk location 520 (corresponding to page frame 514) and includes page descriptors 504 and 508 (each of which belong to page frame 514).

Shared location table 440 can be used to implement page deduplication even when the underlying file system does not support deduplication. However, even if the file system does not support deduplication, the table can contain region checksums instead of their memory locations.

Thus, as noted above, multiple page descriptors can point to the same page frame. This feature was not needed previously because, even if multiple processes were sharing the same page, the page frame belonged to the same file and so a single page descriptor was sufficient. A page descriptor is generally on multiple lists; for example, on one list related to a hash table, on another list of dirty pages, etc. According to an embodiment of the present disclosure, a page descriptor structure contains additional pointers in order to enable it to be on a new list—specifically, the shared page list 450.

Figure 6:
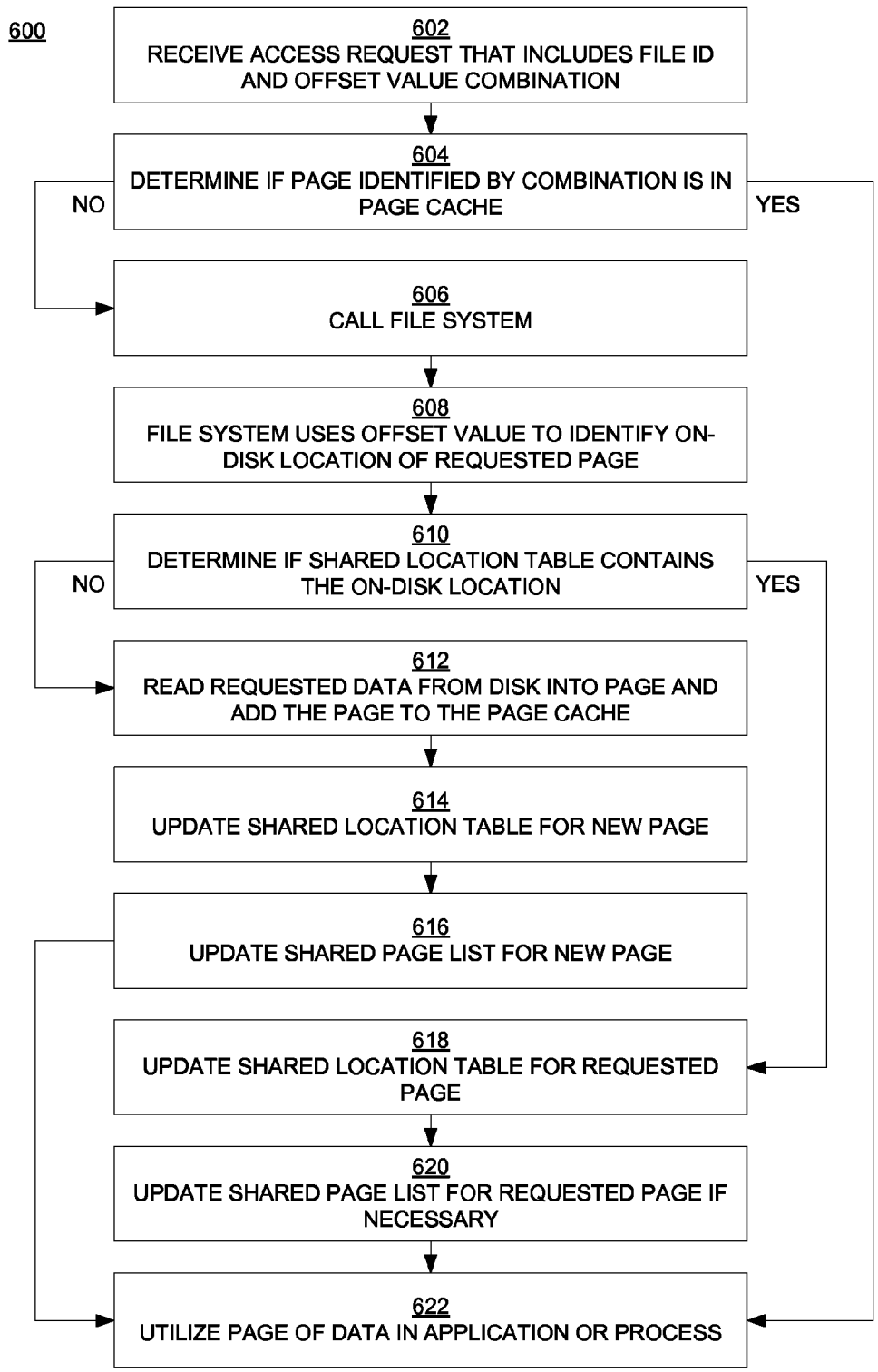
FIG. 6 is a flowchart of a computer-implemented process for accessing a page of data according to embodiments of the disclosure.
Figure 7:
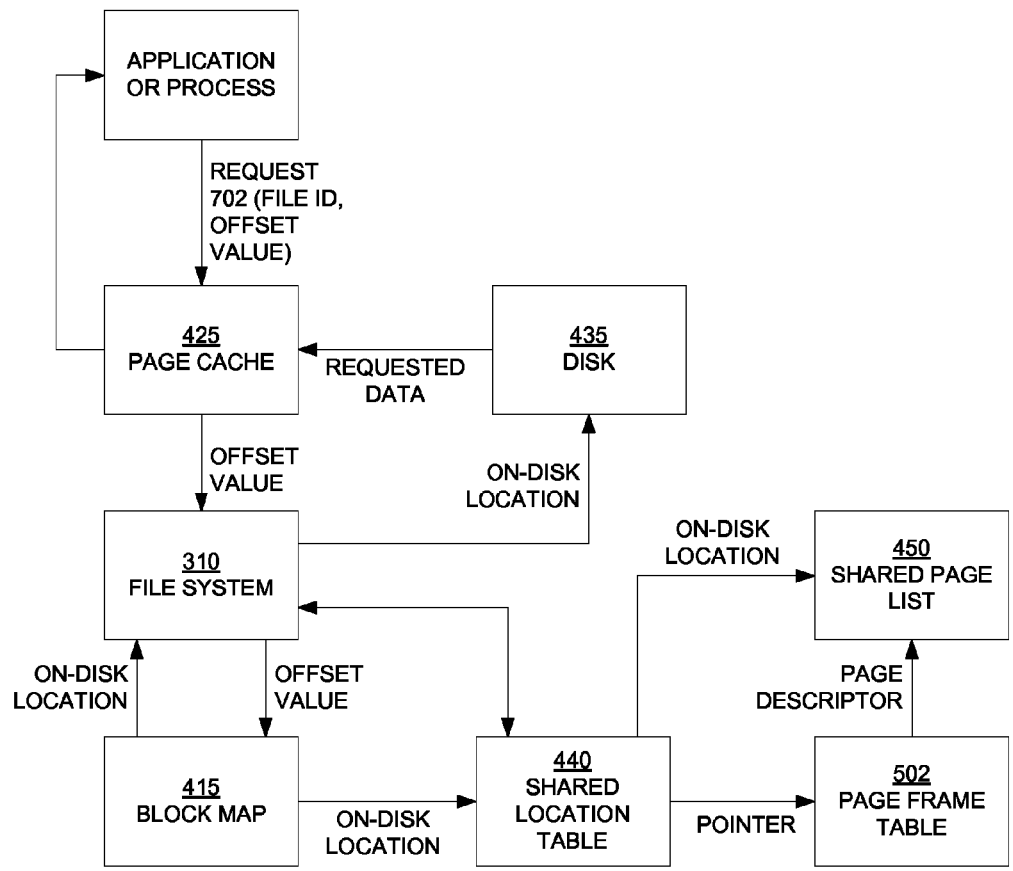
FIG. 7 is a block diagram showing the flow of information and data between selected elements of a system for accessing a page of data according to embodiments of the disclosure.

FIG. 6 is a flowchart 600 of a computer-implemented process for accessing a page while avoiding page deduplication according to embodiments of the disclosure. FIG. 6 is described in conjunction with FIG. 7, which is a block diagram showing the flow of information and data between selected elements of a system for accessing a page while avoiding page deduplication according to embodiments of the disclosure.

In block 602, an access request 702 for a page is received. The request will, in general, include a combination of a file ID (e.g., a vnode or inode number) and an offset value.

In block 604, a check (e.g., by the paging system) is performed to determine if the page identified by the combination of file ID and offset already exists in page cache 425. In one embodiment, page cache 425 is indexed by combinations of file IDs and offset values, and the page cache can be searched by the paging system to see if it contains a page of data indexed by the combination of file ID and offset value included in access request 702.

If the page exists in page cache 425, then the access request is handled accordingly and flowchart 600 proceeds to block 622. Otherwise, flowchart 600 proceeds to block 606.

In block 606, file system 310 is called by the paging system, using an address space operation such as "readpage."

In block 608, file system 310 identifies the on-disk location of the requested page. In one embodiment, file system 310 uses the offset value and block map 415 to identify the on-disk location of the requested page.

In block 610, file system 310 determines if the requested page resides in a shared region of memory (shared regions are discussed in conjunction with FIG. 5, above). In one embodiment, file system 310 determines if shared location table 440 contains the on-disk location.

If the requested page is not in a shared region (and cannot be indexed by the combination of file ID and offset value as described above), then it is also not in page cache 425, and flowchart 600 proceeds to block 612; otherwise, flowchart 600 proceeds to block 618.

In block 612, the requested data is read from disk into a page and is added to page cache 425 using, for example, a standard readpage implementation.

In block 614, shared location table 440 is updated to point to the page descriptor associated with the newly added page; that page descriptor is in page frame table 502.

Also, in block 616, the page descriptor that corresponds to the file ID and offset value included in the access request and points to the newly added page, and the disk location of the newly added page, are added to shared page list 450. Flowchart 600 then proceeds to block 622.

In block 618 (which applies to the case in which the requested page is in a shared region), shared location table 440 is updated to point to the page descriptor that is associated with the requested page; that page descriptor is in page frame table 502. Notably, the page is not added to the page cache; a duplicate of the page is not added to the page cache.

In block 620, the page descriptor that corresponds to the file ID and offset value included in the access request and that points to the requested page is added to shared page list 450 if that page descriptor is not already in that list.

In block 622, the page of data can be utilized in a process or application.

Note that, once a page has been brought into page cache 425, all access requests for the same file will proceed from block 604 directly to block 622. Accesses for the same (shared) region, but for a new file, will bypass block 612. Thus, the amount of overhead associated with flowchart 600 occurs only in memory and is one-time in nature.

Figure 8:
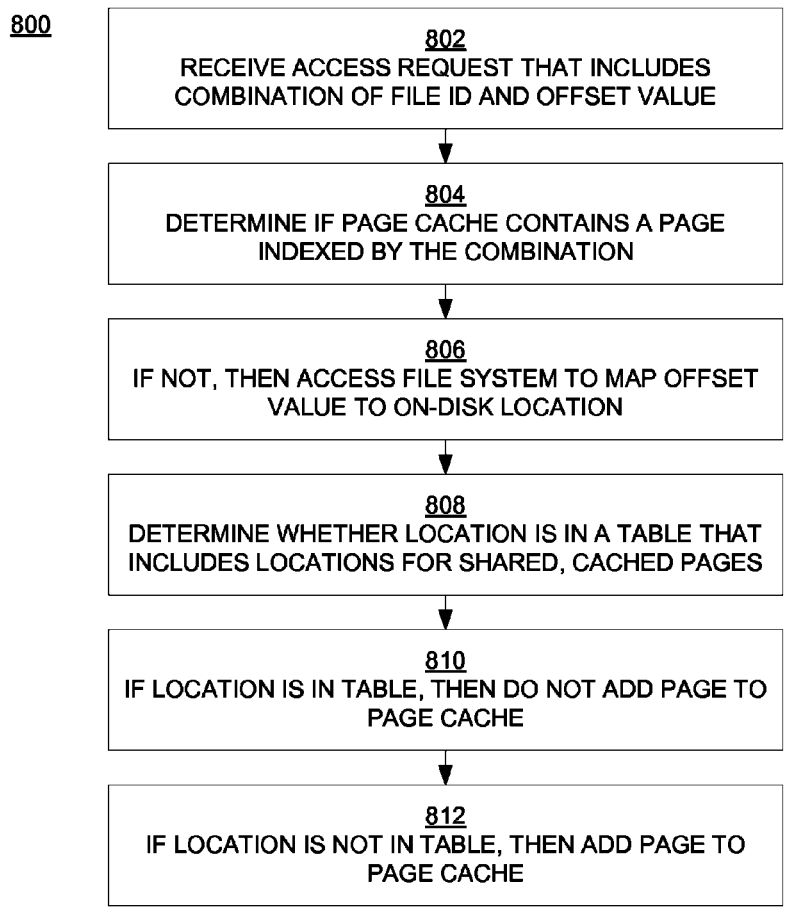
FIG. 8 is a flowchart of a computer-implemented process for avoiding deduplication in a page cache according to embodiments of the disclosure.

FIG. 8 is a flowchart 800 of a computer-implemented process for avoiding deduplication in a page cache according to embodiments of the disclosure.

In block 802, an access request is received. The request includes a combination of a file identifier for a file and an offset value.

In block 804, a determination is made with regard to whether a page cache contains a page of data indexed by the combination. If not, then flowchart 800 proceeds to block 806; otherwise, the request is processed using the page of data indexed by the combination.

In block 806, a file system is accessed to map the offset value to an on-disk location.

In block 808, a determination is made with regard to whether the on-disk location is in a table that includes locations for pages that are shared by multiple files and that are in the page cache.

In block 810, if the location is in the table, then the access request is responded to as previously described herein, without adding the page to the page cache.

In block 812, if the location is not in the table, then the page is added to the page cache and the access request is then responded to.

Figure 9:
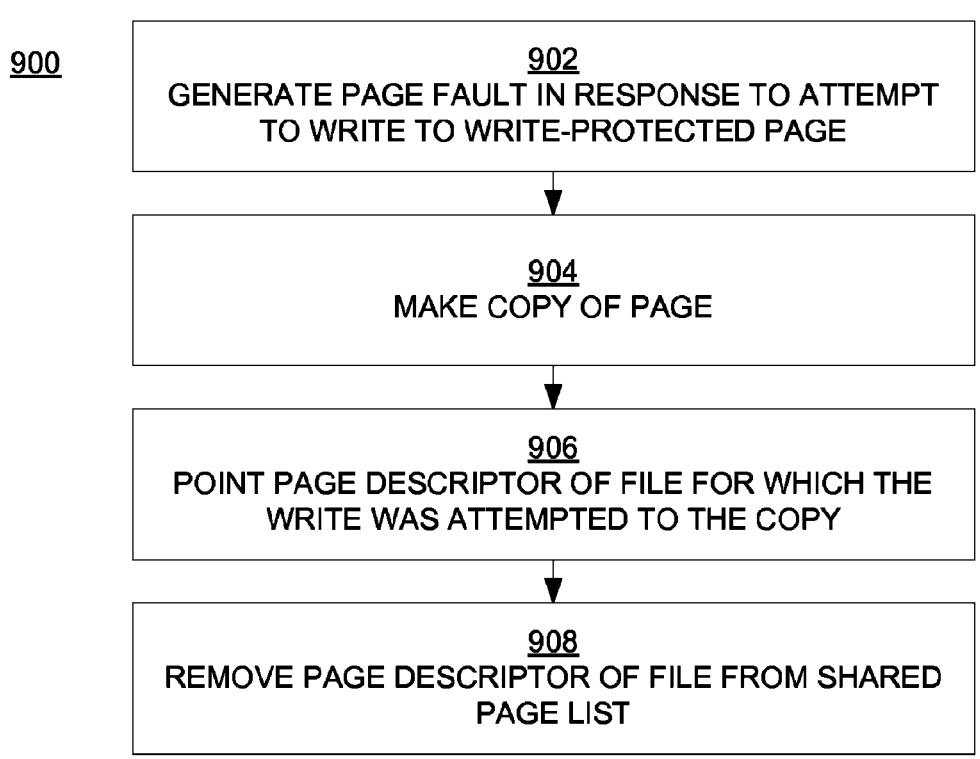
FIG. 9 is a flowchart of a computer-implemented process for modifying a write-protected page according to embodiments of the disclosure.

FIG. 9 is a flowchart 900 of a computer-implemented process for modifying a write-protected page according to embodiments of the disclosure.

In block 902, a page fault is generated in response to an attempt to write to the page.

In block 904, a copy of the page is made.

In block 906, a page descriptor of a file for which the write was attempted to is pointed to the copy of the page.

In block 908, the page descriptor of the file for which the write was attempted is removed from the shared page list (FIG. 4).

Flowcharts 600, 800, and 900 of FIGS. 6, 8, and 9, respectively, can be implemented as computer-executable instructions residing on some form of computer-readable storage medium (e.g., using computing system 110 of FIG. 1).

In summary, according to embodiments of the disclosure, only one copy of a page may be kept in the page cache for all files (or applications or processes) that access identical regions. By eliminating duplicates of pages in the page cache, memory requirements are reduced.

Furthermore, the approach described herein represents a generic approach that can be used across different types of files systems. Accordingly, embodiments according to the present disclosure can support more than read-only memory mappings, and applications do not need to copy data into their respective buffers. Read-only memory mappings are not sufficient for most applications and data, e.g., they are only useful as executables, and storing multiple (e.g., thousands) of copies of the same executable is undesirable. Embodiments of the present disclosure solve this problem by sharing writable mappings and by postponing copy-on-writes of a page to the point at which the actual write happens, not when a file is opened for writable mapping.

For VOP read/write calls, embodiments of the present disclosure can reduce the amount of processing overhead by about one-half relative to a file system-only approach. In a file system-only approach, a search is made by the operating system into page cache using the input inode/vnode and offset combination. However, that will be unsuccessful because the shared page is only indexed by the global vnode. Hence, for each such call, even if the page exists in memory, the file system readpage needs to be invoked. As a result, the file system will have to read the block map or some kind of index to get the device offset from the input vnode offset. If the block map is not currently in memory, then a disk access is needed. Thus, the file system-only approach reduces the benefit of the operating system page cache index.

Moreover, in a file system-only approach, attempts by the operating system to manage (e.g., list/free/invalidate, etc.) all pages of a particular file are likely fruitless because the pages are linked not to the file's vnode but to the global vnode. This can interfere with the page cache, depending on how the operating system implements the page cache.

Finally, in a file system-only approach, the duplicate file pages in page cache and the process-specific virtual memory areas (for example, vm_area_struct in Linux) are linked through a single global vnode. This can reduce the value of the page cache indexing depending on the implementation because the vnode information may be used to narrow the search space for an input vnode/offset combination.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution.

The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein.

One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A non-transitory computer-readable storage medium having computer-executable instructions for causing a computer system to perform a method comprising:
   receiving an access request comprising a combination of a file identifier for a file and an offset value;
   determining whether a page cache contains a page of data indexed by said combination and, if not, then:
      accessing a file system to map said offset value to an on-disk location;
      determining whether said location is in a table comprising locations for pages that are shared by multiple files and that are in said page cache;
      if said location is in said table, then responding to said access request without adding said page to said page cache; and
      if said location is not in said table, then adding said page to said page cache and responding to said access request;
   wherein, if said page is write protected, then:
      generating a page fault in response to an attempt to write to said page;
      making a copy of said page;
      causing a page descriptor of a file for which said write was attempted to point to said copy; and
      removing said page descriptor of said file for which said write was attempted from a list associated with said location.

2. The computer-readable storage medium of claim 1 wherein, if said location is in said table but said page could not be indexed by said combination, then said method further comprises adding an entry to said list associated with said location, said entry comprising said file identifier and said offset value.

3. The computer-readable storage medium of claim 1 wherein, if said location is not in said table, then said method further comprises adding an entry to said list associated with said location, said entry comprising said file identifier and said offset value.

4. The computer-readable storage medium of claim 1 wherein said accessing comprises said file system accessing a block map to identify said location.

5. The computer-readable storage medium of claim 1 wherein said method further comprises, if said page cache contains a page of data indexed by said combination, then responding to said access request.

6. The computer-readable storage medium of claim 1 wherein said table further comprises pointers to page descriptors associated with pages stored in said page cache.

7. A computer system comprising:
   a processor; and
   memory coupled to said processor and having stored therein instructions that, if executed by said computer system, cause said computer system to execute operations comprising:
      determining whether a page cache contains a page of data indexed by a combination of a file identifier for a file and an offset value and, if not, then:
         mapping said offset value to an on-disk location;
         determining whether said location is in a table comprising locations for pages that are in said page cache;
         if said location is in said table, then adding to said table an entry corresponding to said file identifier and said offset value and without adding said page to said page cache; and
         if said location is not in said table, then adding said page to said page cache;
      wherein, if said page is write protected, then:
         generating a page fault in response to an attempt to write to said page;
         making a copy of said page;
         causing a page descriptor of a file for which said write was attempted to point to said copy; and
         removing said page descriptor of said file for which said write was attempted from a list associated with said location.

8. The computer system of claim 7 wherein, if said location is in said table but said page could not be indexed by said combination, then said operations further comprise adding an entry to said list associated with said location, said entry comprising said file identifier and said offset value.

9. The computer system of claim 7 wherein, if said location is not in said table, then said operations further comprise adding an entry to said list associated with said location, said entry comprising said file identifier and said offset value.

10. The computer system of claim 7 wherein said operations further comprise accessing a file system that uses a block map to identify said location.

11. The computer system of claim 7 wherein said operations further comprise, if said page cache contains a page of data indexed by said combination, then responding to said access request.

12. The computer system of claim 7 wherein said table further comprises pointers to page descriptors associated with pages stored in said page cache.

13. A non-transitory computer-readable medium having stored thereon computer-executable components comprising:
   a plurality of pages of data stored in a page cache, said plurality comprising a subset of pages of data stored on-disk;
   a page frame table comprising page descriptors corresponding to said pages stored on-disk; and
   a shared location table comprising on-disk locations of pages in said page cache that are shared by multiple files, wherein an offset value in an access request for a page of data is mapped to an on-disk location, wherein further if said location is in said table then said page is not added to said page cache in response to said access request, and if said location is not in said table then said page is added to said page cache in response to said access request;
wherein, if said page is write protected, then:
- generating a page fault in response to an attempt to write to said page;
- making a copy of said page;
- causing a page descriptor of a file for which said write was attempted to point to said copy; and
- remove said page descriptor of said file for which said write was attempted from a list associated with said location.

14. The computer-readable medium of claim 13 wherein said list comprises an entry comprising said location, a file identifier included in said access request, and said offset value.

15. The computer-readable medium of claim 13 wherein, if said location is not in said shared location table, then an entry is added to said list associated with said location, said entry comprising a file identifier included in said access request and said offset value.

16. The computer-readable medium of claim 13 wherein said computer-executable components further comprise a block map to identify said location.

17. The computer-readable medium of claim 13 wherein said shared location table further comprises pointers to page descriptors associated with pages stored in said page cache.

* * * * *